US010300937B2

(12) United States Patent
Peyrot et al.

(10) Patent No.: US 10,300,937 B2
(45) Date of Patent: May 28, 2019

(54) DECORATIVE PART FOR A STEERING WHEEL OF A VEHICLE

(71) Applicants: Mickael Peyrot, Latillé (FR); Frederic Moulinas, Poitiers (FR)

(72) Inventors: Mickael Peyrot, Latillé (FR); Frederic Moulinas, Poitiers (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/743,341

(22) PCT Filed: Jul. 7, 2016

(86) PCT No.: PCT/EP2016/066094
§ 371 (c)(1),
(2) Date: Jan. 10, 2018

(87) PCT Pub. No.: WO2017/009163
PCT Pub. Date: Jan. 19, 2017

(65) Prior Publication Data
US 2018/0222516 A1 Aug. 9, 2018

(30) Foreign Application Priority Data

Jul. 13, 2015 (FR) ...................... 15 56646

(51) Int. Cl.
B62D 1/06 (2006.01)
(52) U.S. Cl.
CPC ...................... B62D 1/06 (2013.01)

(58) Field of Classification Search
CPC ............. B62D 1/04; B62D 1/06; B62D 1/065
(Continued)

(56) References Cited

U.S. PATENT DOCUMENTS 2,814,211 A * 11/1957 Hoagg ................. B62D 1/06
74/552
3,227,000 A * 1/1966 Gits ..................... B29C 45/14
156/245

(Continued)

FOREIGN PATENT DOCUMENTS

| EP | 1195312 A2 | 4/2002 |
| EP | 1604797 A1 | 12/2005 |
| WO | WO-02051631 A1 | 7/2002 |

OTHER PUBLICATIONS

GO2 Glue by Loctite; Published on Mar. 2, 2013. http://www.loctiteproducts.com/p/go2_glue/overview/Go2-Glue.htnn (Year: 2013).*

(Continued)

Primary Examiner — Adam D Rogers
(74) Attorney, Agent, or Firm — Stephen T. Olson; Harness, Dickey & Pierce, P.L.C.

(57) ABSTRACT

A decorative piece of a vehicle steering wheel decoration arranged to be mounted on a steering wheel of the vehicle includes a decorative core made from a decorative material, such as wood. A protective portion of the decorative core made from a transparent or translucent material covering at least part of a surface of the decorative core is arranged to be visible by a user. A fastening portion is arranged to fasten the decorative part on the steering wheel. The fastening portion is made from the same transparent or translucent material as the protective portion.

8 Claims, 1 Drawing Sheet

(58) Field of Classification Search
USPC .......................................................... 29/894.1
See application file for complete search history.

(56) References Cited

U.S. PATENT DOCUMENTS

| | | | | |
|---|---|---|---|---|
| 5,207,713 | A * | 5/1993 | Park | B60R 21/05 280/750 |
| 6,065,366 | A * | 5/2000 | Koyama | B62D 1/04 156/293 |
| 6,386,063 | B1 * | 5/2002 | Hayashi | B29C 45/1671 74/552 |
| 6,637,289 | B2 * | 10/2003 | Kreuzer | B62D 1/06 74/552 |
| 6,684,733 | B2 * | 2/2004 | Faigenblat | B29C 41/20 74/558 |
| 9,586,608 | B2 * | 3/2017 | Fiumefreddo | B62D 1/06 |
| 9,710,144 | B2 * | 7/2017 | Jubner | G06F 3/04883 |
| 2001/0010179 | A1 * | 8/2001 | Ku | B62D 1/06 74/558 |
| 2002/0017157 | A1 | 2/2002 | Kreuzer et al. | |
| 2002/0054487 | A1 * | 5/2002 | Parker | B60Q 1/0082 362/23.11 |
| 2002/0078647 | A1 | 6/2002 | Faigenblat | |
| 2003/0192397 | A1 | 10/2003 | Kreuzer et al. | |
| 2005/0276874 | A1 | 12/2005 | Menaldo et al. | |
| 2008/0202282 | A1 * | 8/2008 | Bassett | B62D 1/06 74/552 |
| 2009/0095121 | A1 * | 4/2009 | Huang | B62D 1/06 74/558 |
| 2010/0107806 | A1 * | 5/2010 | Corinaldi | B62D 1/046 74/552 |
| 2016/0347346 | A1 * | 12/2016 | Simmons | B62D 1/06 |

OTHER PUBLICATIONS

International Search Report for PCT/EP2016/066094, ISA/EP, Rijswijk, NL, dated Sep. 13, 2016, with translation thereof.
Written Opinion of the ISA for PCT/EP2016/066094, ISA/EP, Rijswijk, NL, dated Sep. 13, 2016.

* cited by examiner

DECORATIVE PART FOR A STEERING WHEEL OF A VEHICLE

CROSS REFERENCE TO RELATED APPLICATIONS

This application is a U.S. National Phase Application under 35 U.S.C. 371 of International Application No. PCT/EP2016/066094, filed on Jul. 7, 2016 and published in French as WO 2017/009163 A1 on Jan. 19, 2017. This application claims the benefit of priority from French Patent Application No. 1556646 filed Jul. 13, 2015. The entire disclosures of the above applications are incorporated herein by reference.

FIELD

The present invention generally relates to a decorative piece intended to be mounted on a motor vehicle, and in particular on a steering wheel of the vehicle.

BACKGROUND

It is known in the prior art to cover a decorative material such as wood with a transparent or translucent varnish to obtain a decorative piece that is pleasing to look at and touch and that withstands wear, like that described in document US 2005276874. However, the method for manufacturing the disclosed decorative piece is complicated, since it in particular has the drawback of requiring a second step during which a fastening portion is made on the back of the piece.

SUMMARY

One aim of the present invention is to resolve the drawbacks of the prior art document mentioned above, and in particular, first of all, to propose a decorative piece arranged to be mounted on a vehicle steering wheel with a high-quality appearance, while being simple and inexpensive to manufacture.

To that end, a first aspect of the invention relates to a decorative piece for a vehicle arranged to be mounted on a steering wheel of the vehicle comprising a decorative core made from a decorative material, such as wood, a protective portion of the decorative core, made from a transparent or translucent material covering at least part of the surface of the decorative core arranged to be visible by a user, and a fastening portion arranged to fasten the decorative piece on the steering wheel. The fastening portion is made from the same transparent or translucent material as the protective portion. The decorative piece according to the present embodiment therefore comprises a decorative core made from the decorative material (wood, for example, but also carbon fiber, Kevlar®, glass, or a mixture of these materials), and the visible surface of which, once the decorative piece is mounted on the steering wheel, is covered by a transparent or translucent material to provide protection and a pleasant appearance and feeling for the user. However, the decorative piece is easy to manufacture, since the fastening portion is made from the same transparent or translucent material. This makes it possible to have only one material to be provided in addition to the material of the decorative core. This standardization makes it possible to limit costs, and also to simplify the manufacturing machines, which have only one material to add to the decorative core to manufacture the decorative piece.

A transparent material refers to a material that allows light to pass, that does not shield one's view, and a translucent material refers to a material that allows rays of light to pass, but does not allow a clear distinction of the contours or colors of the objects.

Advantageously, the fastening portion has at least one U-shaped section. Such a section is advantageous to cooperate with the foam of the steering wheel, which makes it possible to guarantee correct positioning during assembly. This is also useful to guarantee a controlled deposition of a glue or an adhesive that may be added between the decorative piece and the steering wheel only at the bottom of the U-shaped section.

Advantageously, the fastening portion comprises retaining means such as clips arranged to keep the decorative piece on the steering wheel.

Advantageously, the translucent material is polyurethane. It is for example possible to consider an injectable polyurethane.

Advantageously, the protective portion and the fastening portion are made in a single and same operation. This makes it possible to guarantee better docking between the decorative piece and the steering wheel, since the allowances between the fastening portion and the decorative core are reduced. Indeed, a reaction operation as proposed by the prior art requires positioning allowances that are necessarily passed on to the dimensional allowances of the final decorative piece.

Advantageously, the decorative core is completely covered by the transparent or translucent material.

A second aspect of the invention relates to a vehicle steering wheel comprising at least one decorative piece according to the first aspect.

A third aspect of the invention relates to a motor vehicle comprising at least one decorative piece according to the first aspect.

A fourth aspect of the invention relates to a method for manufacturing a decorative piece for a vehicle arranged to be mounted on a steering wheel, including positioning, in an injection mold, a decorative core made from a decorative material such as wood; injecting a transparent or translucent material so as to produce, simultaneously:

a protective portion of the decorative core made from transparent or translucent material covering at least part of a surface of the decorative core arranged to be visible by a user; and a fastening portion arranged to fasten the decorative piece on the steering wheel, made from the same transparent or translucent material as the protective portion.

BRIEF DESCRIPTION OF THE DRAWINGS

Other features and advantages of the present invention will appear more clearly upon reading the following detailed description of one embodiment of the invention provided as a non-limiting example and illustrated by the appended drawings, in which.

DETAILED DESCRIPTION

Figure 1:
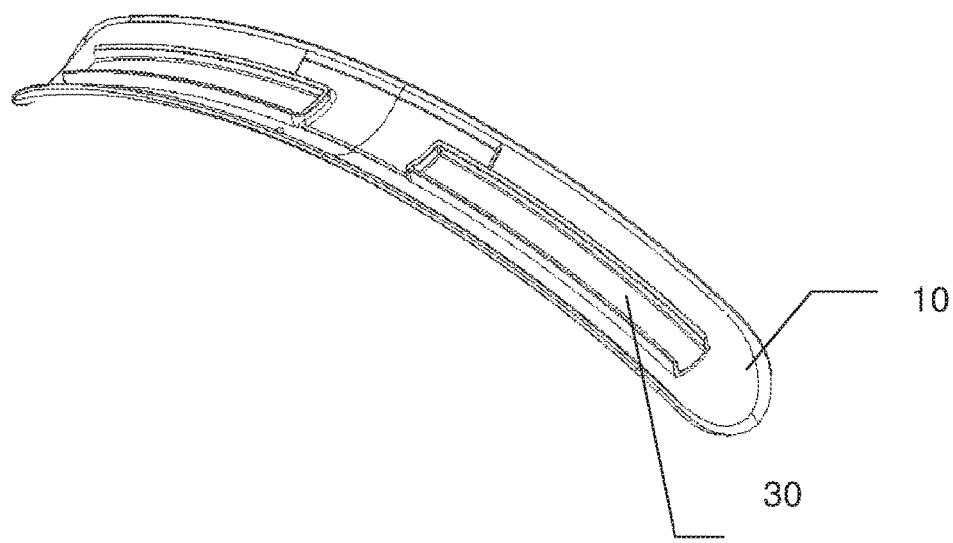
FIG. 1 is an isometric view of a decorative piece according to the invention.

FIG. 1 shows an isometric view of a rear face of a decorative piece comprising a decorative core 10 that comprises wood, and a fastening portion 30 molded on the decorative core 10.

Figure 3:
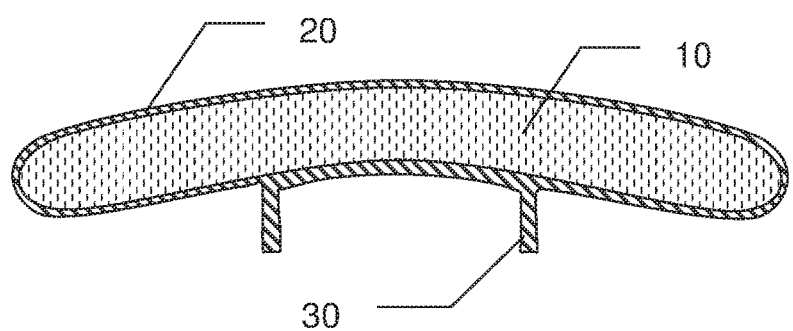
FIG. 3 is a sectional view of the decorative piece of FIG. 1.

As shown in FIG. 3, which is a cross-section of the same decorative piece, the decorative core 10 is completely covered with a plastic material.

On the rear face, the fastening portion 30 has a U-shaped section to be able to be fastened on a vehicle steering wheel, and on the front, opposite face, a protective portion 20 covers the decorative core 10.

To make the decorative core 10 visible to the occupants of the vehicle, the material used to produce the protective portion 20 is transparent or translucent, i.e., it allows light to pass completely, or at least diffusely. For example, a polyurethane varnish is perfectly suitable for forming the protective portion 20, since this material is transparent and, once polymerized, such a polymer is very resistant to wear and scratches.

In order to simplify the manufacturing of the decorative piece according to the invention, the same material is used to produce the fastening portion 30, and it is possible to consider making these two parts (the protective portion 20 and the fastening portion 30) during the same manufacturing operation, for example a pressurized injection molding operation.

Figure 2:
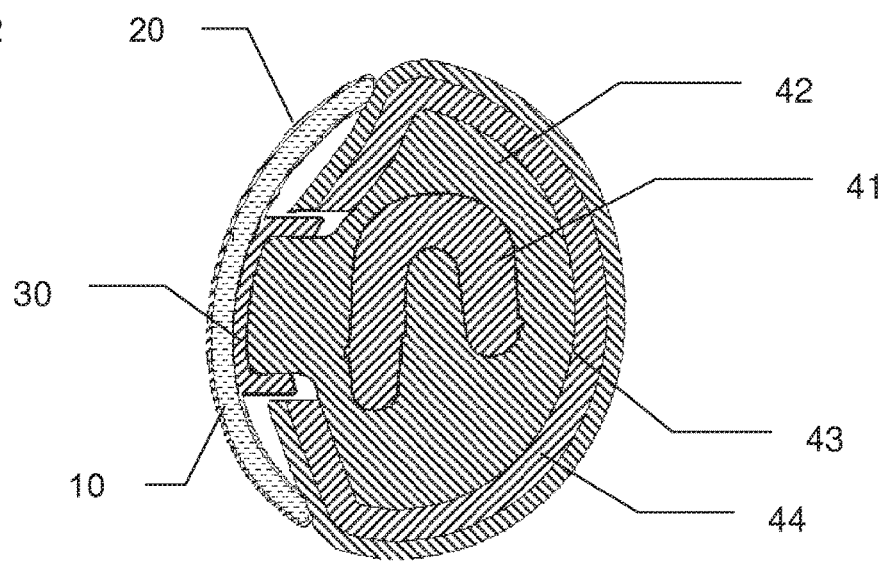
FIG. 2 is a sectional view of a vehicle steering wheel on which the decorative piece of FIG. 1 is mounted.

FIG. 2 shows the decorative piece of FIGS. 1 and 3 mounted on a vehicle steering wheel. FIG. 2 in particular shows a sectional view of the rim of such a steering wheel, which comprises a carcass 41 on which a foam 42 (for example made from polyurethane) is made that is optionally covered with a heating sheath 43, all of which is covered by a leather jacket 44, for example.

In order to hide the edges of the leather jacket 44, the decorative piece is fastened on the rim via the fastening portion 30 (for example, by gluing), so that the decorative core hides the edges of the jacket 44. Lastly, the protective portion 20 makes it possible to protect the decorative core 10 from wear and friction.

It will be understood that various modifications and/or improvements that are obvious to one skilled in the art may be made to the various embodiments of the invention described in the present description without going beyond the context of the invention defined by the appended claims. In particular, reference is made to wood for the decorative core, but it is possible to consider having other materials, such as carbon fiber, Kevlar, glass fiber, or even a technical plastic that copies the appearance of one of the aforementioned materials and that must be protected and fastened on the steering wheel.

Furthermore, mention is made of fastening of the decorative piece on the steering wheel by gluing, but it is possible to consider other fastening means, such as clipping by clipping tabs, ultrasonic welding, for example.

The invention claimed is:

1. A decorative piece of a vehicle steering wheel decoration arranged to be mounted on a steering wheel of a vehicle, comprising:
   a decorative core made from a decorative material;
   a protective portion of the decorative core covering at least part of a surface of the decorative core arranged to be visible by a user;
   a fastening portion arranged to fasten the decorative piece on the steering wheel,
   wherein the fastening portion is made from a fastening portion material and the protective portion is made from a protective portion material, the fastening portion material and the protective portion material being a same material, the same material selected from a group consisting of a transparent material and a translucent material.

2. The decorative piece of claim 1, wherein the same material is polyurethane.

3. A method of manufacturing a decorative piece of a vehicle decoration arranged to be mounted on a steering wheel, the method comprising:
   positioning a decorative core made from a decorative material,
   injecting a material selected from a group consisting of a transparent material and a translucent material so as to simultaneously produce:
      a protective portion of the decorative core made from the material covering at least part of a surface of the decorative core arranged to be visible by a user, and
      a fastening portion arranged to fasten the decorative piece on the steering wheel, made from the material.

4. The decorative piece of claim 3, wherein the fastening portion has a U-shaped section defined in part by a first leg and a second leg, the first and second legs extending from the decorative core.

5. The decorative piece of claim 3, wherein the protective portion and the fastening portion are made in a single and same operation.

6. The decorative piece of claim 3, wherein the material completely surrounds the decorative core.

7. The method of claim 3, wherein the decorative material is wood.

8. The decorative piece of claim 3, wherein the same material is polyurethane.

* * * * *